US010954823B2

(12) United States Patent
Gaca et al.

(10) Patent No.: US 10,954,823 B2
(45) Date of Patent: Mar. 23, 2021

(54) ADJUSTABLE LOCKING BLOCK ASSEMBLY FOR A TOOTHED GEAR AND METHODS OF USING SAME

(71) Applicant: General Electric Company, Schenectady, NY (US)

(72) Inventors: Magdalena Ewa Gaca, Grudziadz (PL); Chad Duncan Munkres, Schenectady, NY (US); Sean Cornelius O'Meara, Schenectady, NY (US); John Matthew Sassatelli, Valley Falls, NY (US); Robert Oliver Perry, Jr., Tribes Hill, NY (US); Adrian Adam Klejc, Mazowieckie (PL); Michal Wojciech Wnuk, Mazowieckie (PL); Michael Alan Davi, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/473,973

(22) PCT Filed: Dec. 27, 2016

(86) PCT No.: PCT/PL2016/050058
§ 371 (c)(1),
(2) Date: Jun. 26, 2019

(87) PCT Pub. No.: WO2018/124893
PCT Pub. Date: Jul. 5, 2018

(65) Prior Publication Data
US 2019/0345846 A1    Nov. 14, 2019

(51) Int. Cl.
*F01D 25/34*    (2006.01)
*B23Q 3/06*    (2006.01)
(Continued)

(52) U.S. Cl.
CPC .............. *F01D 25/34* (2013.01); *B23Q 3/06* (2013.01); *B23Q 3/12* (2013.01); *F16B 1/02* (2013.01); *F16D 63/006* (2013.01)

(58) Field of Classification Search
CPC .......... F01D 25/34; F16D 63/006; F16B 1/02; B23Q 3/12; B23Q 3/06
See application file for complete search history.

(56) References Cited

U.S. PATENT DOCUMENTS 3,661,403 A    5/1972   Path
3,929,025 A *  12/1975  Perry ...................... B62M 9/16
                                                    474/70
(Continued)

FOREIGN PATENT DOCUMENTS

EP    2327607 A2    6/2011
EP    1628811 B1    6/2012
(Continued)

OTHER PUBLICATIONS

International Search Report for related application PCT/PL2016/050058 dated May 10, 2017; 2 pp.

*Primary Examiner* — Shafiq Mian
(74) *Attorney, Agent, or Firm* — Armstrong Teasdale LLP

(57) ABSTRACT

A block assembly for locking a toothed gear housed in a frame includes a body shaped to couple to a portion of the frame adjacent to the gear for translation in a first direction parallel to an axis of the gear, and a locking block coupled to the body that includes at least one locking tooth shaped complementary to at least one gear tooth of the gear. The block assembly further includes an adjustment mechanism operable, when the body is coupled to the frame, to move the locking block in a second direction that is substantially orthogonal the axis of the gear, such that at least one locking
(Continued)

tooth is received between a circumferentially spaced pair of the gear teeth to prevent movement of the toothed gear.

19 Claims, 8 Drawing Sheets

(51) Int. Cl.
*B23Q 3/12* (2006.01)
*F16B 1/02* (2006.01)
*F16D 63/00* (2006.01)

(56) References Cited

U.S. PATENT DOCUMENTS

| | | | |
|---|---|---|---|
| 4,177,696 A * | 12/1979 | Moss | B23Q 15/26 |
| | | | 74/813 C |
| 5,157,983 A * | 10/1992 | Sankovic | B23Q 11/0092 |
| | | | 74/411.5 |
| 5,950,294 A | 9/1999 | Gibbs | |
| 6,315,089 B1 | 11/2001 | Fink et al. | |
| 6,912,768 B2 | 7/2005 | Whitehead | |
| 7,490,737 B2 | 2/2009 | Cocciadiferro et al. | |
| 7,515,999 B2 | 4/2009 | Wolff | |
| 7,722,490 B2 | 5/2010 | Tay | |
| 7,735,685 B2 | 6/2010 | Bertram | |
| 7,959,103 B2 | 6/2011 | Cocciadiferro et al. | |
| 8,169,169 B2 | 5/2012 | Hass et al. | |
| 8,187,151 B2 | 5/2012 | Gloge | |
| 8,272,331 B2 | 9/2012 | Lund | |
| 8,490,722 B2 | 7/2013 | Koga et al. | |
| 8,628,439 B2 | 1/2014 | Tay | |
| 8,702,389 B2 | 4/2014 | Wedekind et al. | |
| 8,760,030 B2 | 6/2014 | Ross et al. | |
| 2003/0084557 A1 | 5/2003 | Whitehead | |
| 2009/0069132 A1 | 3/2009 | Tay | |
| 2009/0188346 A1 | 7/2009 | Hampton | |
| 2009/0265992 A1 | 10/2009 | Hass et al. | |
| 2010/0018808 A1 | 1/2010 | Gloge | |
| 2010/0062884 A1 | 3/2010 | Tay | |
| 2010/0329868 A1 | 12/2010 | Ben et al. | |
| 2011/0061559 A1 | 3/2011 | Lund | |
| 2011/0127093 A1 | 6/2011 | Koga et al. | |
| 2011/0298310 A1 | 12/2011 | Ross et al. | |
| 2013/0243579 A1 * | 9/2013 | Bastier | F01D 25/34 |
| | | | 415/122.1 |
| 2014/0163664 A1 | 6/2014 | Goldsmith | |
| 2018/0051593 A1 * | 2/2018 | Sajdak | F16H 35/18 |

FOREIGN PATENT DOCUMENTS

| | | |
|---|---|---|
| EP | 2466303 A1 | 6/2012 |
| EP | 2327607 B1 | 4/2013 |
| EP | 2758510 A1 | 7/2014 |
| EP | 18365663 B1 | 10/2014 |
| GB | 862126 A | 3/1961 |
| WO | 2011049537 A2 | 4/2011 |
| WO | 2012164238 A2 | 12/2012 |
| WO | 2013026508 A1 | 2/2013 |
| WO | 2013052318 A1 | 4/2013 |

* cited by examiner

ADJUSTABLE LOCKING BLOCK ASSEMBLY FOR A TOOTHED GEAR AND METHODS OF USING SAME

CROSS-REFERENCE TO RELATED APPLICATIONS

This application is a U.S. National Phase Application of PCT/PL2016/050058, filed Dec. 27, 2016, the entire contents and disclosure of which is incorporated by reference herein in its entirety.

BACKGROUND

The subject matter disclosed herein relates generally to a toothed gear and, more particularly, to an adjustable locking block assembly for use in a toothed gear.

At least some rotary machines require a toothed gear to be temporarily locked to prevent movement during an inspection and/or during maintenance of the rotary machine. Preventing movement of the gear facilitates increasing the safety of personnel performing the inspection or maintenance. However, at least some known devices for locking a toothed gear are cumbersome and difficult to align and engage with the gear, and as such, such devices may not be installed correctly, such that undesirable movement of the toothed gear may still occur. Moreover, because of the difficulty in installing such devices, a time required for inspection and maintenance of the rotary machine is increased.

In addition, at least some larger, dynamoelectric machines, such as steam turbines, are equipped with toothed gears (e.g., turning gears) that impart a slow rotation to their rotors during initial warm up and cooling down periods. More specifically, known turning gears facilitate maintaining a substantially uniform temperature within the rotor, such that the rotor does not warp or deform under its own weight as it is initially heated or as it cools down.

BRIEF DESCRIPTION

In one aspect, a block assembly for locking a toothed gear housed in a frame is provided. The block assembly includes a body shaped to couple to a portion of the frame adjacent to the gear for translation in a first direction parallel to an axis of the gear, and a locking block coupled to the body that includes at least one locking tooth shaped complementary to at least one gear tooth of the gear. The block assembly further includes an adjustment mechanism operable, when the body is coupled to the frame, to move the locking block in a second direction that is substantially orthogonal the axis of the gear, such that at least one locking tooth is received between a circumferentially spaced pair of the gear teeth to prevent movement of the toothed gear.

In another aspect, a method of locking a toothed gear relative to a frame is provided. The method includes coupling a body of an adjustable locking block assembly to a portion of the frame adjacent to the gear. The locking block assembly includes a locking block and at least one locking tooth shaped complementary to at least one tooth of the gear. The method further includes operating an adjustment mechanism to selectively move the locking block in a second direction that is substantially orthogonal to an axis of rotation of the gear, such that the at least one locking tooth is positioned between a pair of circumferentially spaced gear teeth, and selectively positioning the body along the frame in a first direction that is substantially parallel to the axis of rotation of the gear, such that the at least one locking tooth engages the gear to prevent movement of the gear.

DETAILED DESCRIPTION

Exemplary embodiments of the present disclosure relate to an adjustable locking block assembly for use with a toothed gear, such as but not limited to a turning gear of a steam turbine assembly. More particularly, in the exemplary embodiment, the locking block assembly includes a body shaped to couple to, for example, a frame housing the toothed gear, for movement in a first direction parallel to an axis of the gear. The locking block assembly also includes a locking block that includes at least one tooth shaped complementary to the teeth of the gear. When the body is coupled to the frame, the relative position of the locking block is adjustable in a second direction that is substantially orthogonal to the axis of the gear. The adjustable locking block thus enables fine adjustment of a position of the locking block with respect to the teeth of the gear to ensure that at least one tooth of the locking block smoothly engages with gear teeth of the toothed gear when the body is moved adjacent to the gear.

In the following description, reference will be made to a number of terms, which shall be defined to have the following meanings.

The singular forms "a", "an", and "the" include plural references unless the context clearly dictates otherwise. Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the subranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
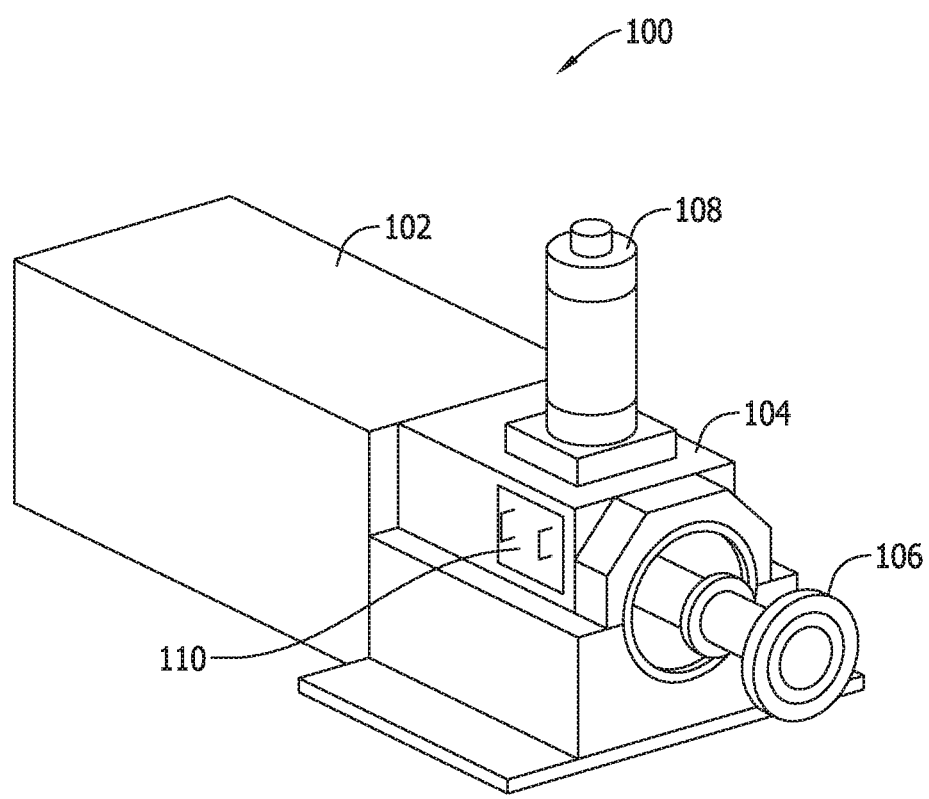
FIG. 1 is a perspective view of an exemplary steam turbine assembly.

Although generally described herein with respect to a steam turbine system, the adjustable locking block assembly of the present application is applicable to any type of rotating machine in which it may be desirable to lock a toothed gear to enable inspection and/or maintenance of the machine FIG. 1 is a perspective view of an exemplary steam turbine assembly 100. In the exemplary embodiment, steam turbine assembly 100 includes a turbine portion 102, a bearing housing 104, such as a front standard, coupled to turbine portion 102, a shaft 106 that extends through turbine portion 102 and bearing housing 104, and a turning gearbox and motor 108.

Bearing housing 104 houses a toothed gear, such as a turning gear 602 (shown in FIGS. 6 and 7), that engages with, and that is driven by, turning gearbox and motor 108. As used herein, the term "turning gear" may be used to refer to any toothed gear, including, for example, any propriety and/or non-proprietary turning gear, such as a turning gear of steam turbine assembly 100.

Shaft 106 defines an axis 114 or rotation of turning gear 602. In the exemplary embodiment, bearing housing 104 also includes a manhole or cover 110 that can be removed to expose an opening or a window 112 that provides access to turning gear 602. In certain embodiments, turning gearbox and motor 108 are operable to impart a slow rotation to shaft 106, and thus to a rotor (not shown) of steam turbine system 100, so that during an initial warm up and/or cooling down period, the rotor does not warp, bow, or deform under its own weight as it heats up and cools down.

Figure 2:
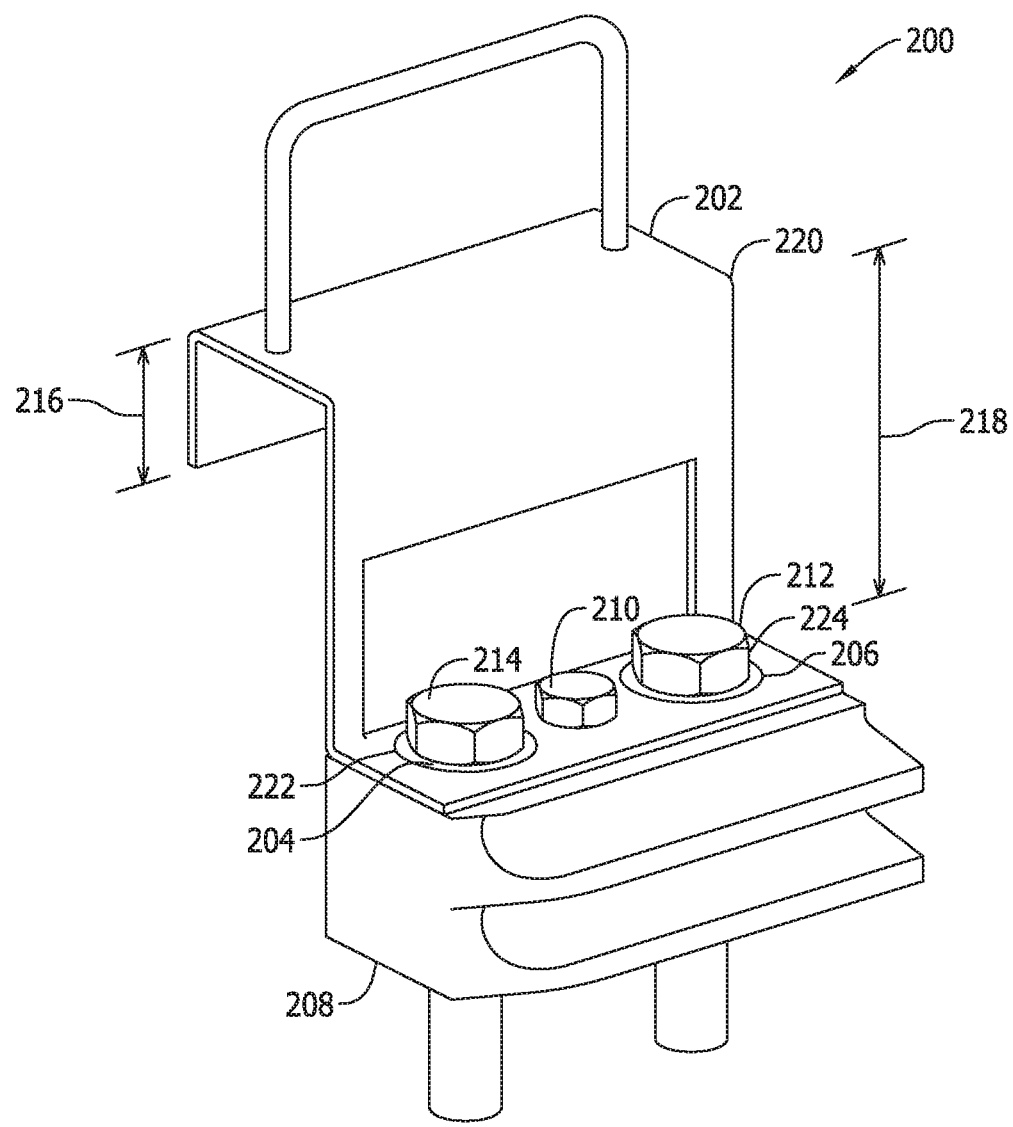
FIG. 2 is a perspective view of an exemplary adjustable locking block assembly that may be used with the turbine assembly shown in FIG. 1.
Figure 3:
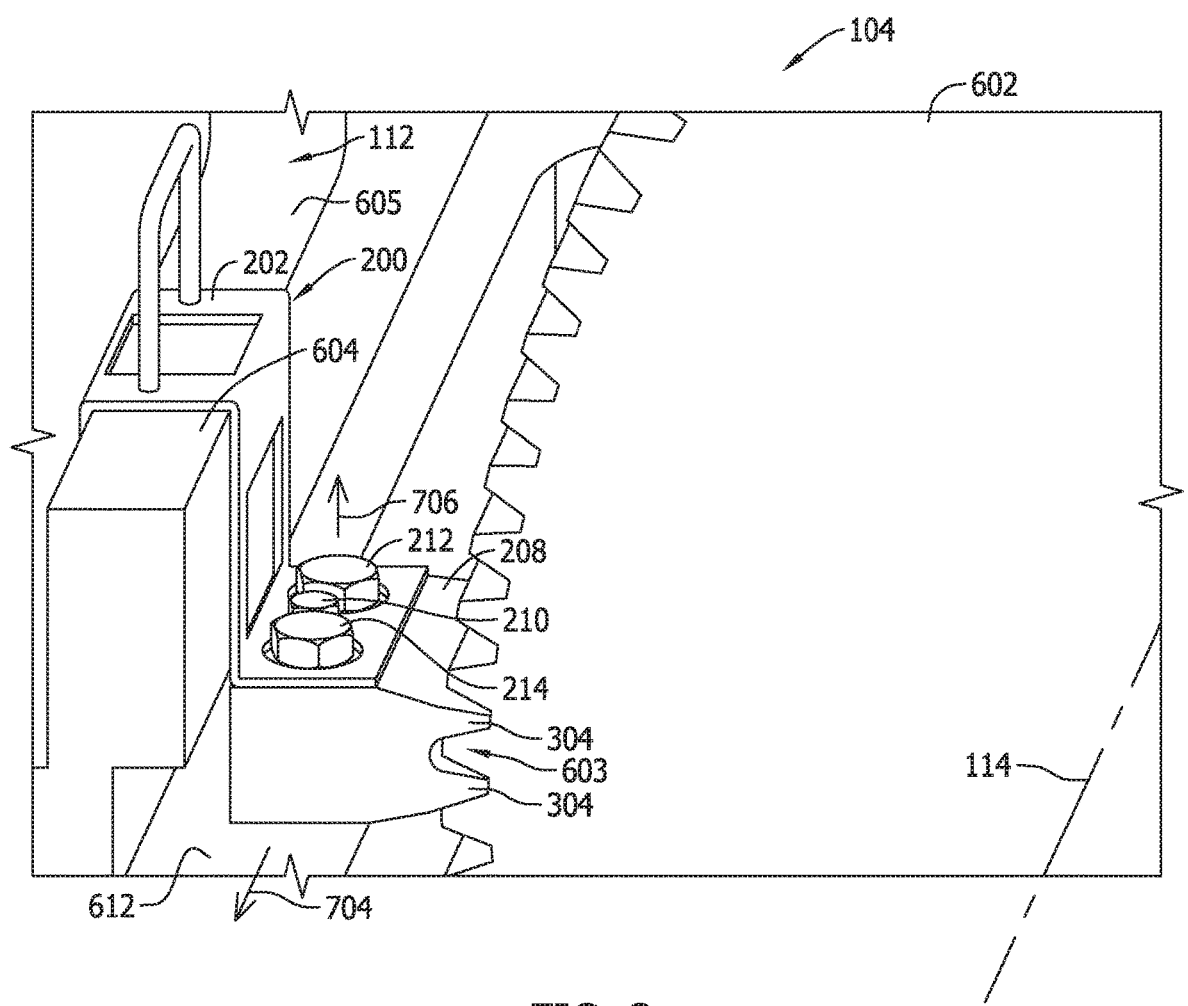
FIG. 3 is a perspective view of the adjustable locking block assembly shown in FIG. 2 and installed on the steam turbine assembly shown in FIG. 1.

FIG. 2 is a perspective view of an exemplary adjustable locking block assembly 200. FIG. 3 is a perspective view of adjustable locking block assembly 200 coupled to turning gear 602. With reference to FIGS. 2 and 3, adjustable locking block assembly 200 is configured to lock turning gear 602 during inspection and maintenance procedures.

Adjustable locking block assembly 200 includes a body 202, such as a bracket, and a locking block 208 coupled to body 202. More specifically, body 202 is shaped to couple to a portion of frame 604 of bearing housing 104 adjacent gear 602 for translation of body 202 in a first direction 704 that is substantially parallel to gear axis 114. In the exemplary embodiment, body 202 is shaped to couple to an edge 605 of frame 604 that defines window 112 (shown in FIG. 1). More specifically, body 202 includes an inverted U-shaped portion 216 that is shaped to receive frame edge 605 in a friction fit, such that body 202 is slidable along edge 605 parallel to first direction 704, but is prevented from falling from edge 605. Thus, body 202 facilitates reducing a risk that adjustable locking block assembly 200 could fall within frame 604 into, for example, a difficult-to-retrieve or damaging position. In alternative embodiments, body 202 is shaped to couple to any suitable portion of frame 604 that enables body 202 to function as described herein.

Body 202 also includes a coupling portion 218 that couples to locking block 208. In some embodiments, coupling portion 218 and locking block 208 are rigidly coupled together, such that body 202 and locking block 208 function as a unitary body and are constrained to move together. For example, in the exemplary embodiment, coupling portion 218 is an L-shaped portion that is integrally formed with inverted U-shaped portion 216, and locking block 208 is rigidly coupled to coupling portion 218 via at least one fastener 210. In alternative embodiments, locking block 208 is coupled to body 202 in any other manner that enables adjustable locking block assembly 200 to function as described herein. For example, but not by way of limitation, locking block 208 may be integrally formed with body 202.

Figure 4:
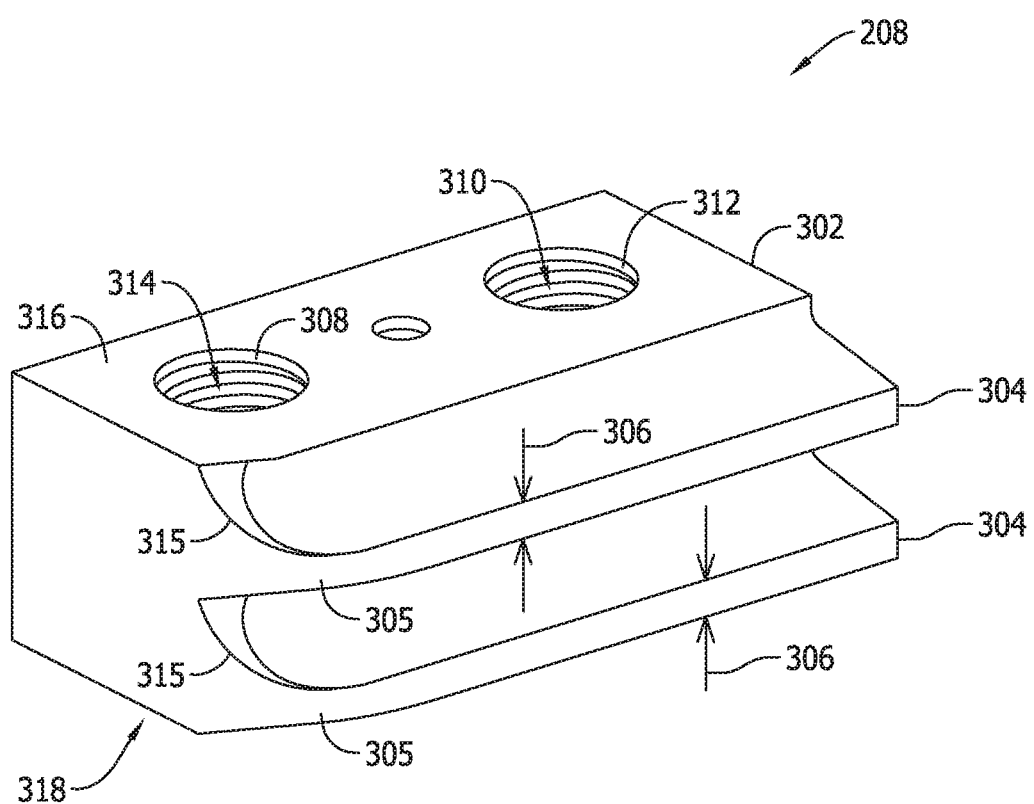
FIG. 4 is a perspective view of an exemplary locking block that may be used with the adjustable locking block assembly shown in FIG. 2.

FIG. 4 is a perspective view of an exemplary locking block 208 of adjustable locking block assembly 200. With reference to FIGS. 3 and 4, locking block 208 includes at least one locking tooth 304 that is shaped complementary to teeth 603 of gear 602. For example, in the exemplary embodiment, locking block 208 includes two locking teeth 304. In alternative embodiments, locking block 208 may include any number of locking teeth 304 that enables locking block 208 to function as described herein.

In some embodiments, each locking tooth 304 includes a first end 305 that is shaped to facilitate an axial sliding engagement with gear teeth 603. For example, in the exemplary embodiment, first end 305 is rounded, and when adjustable locking block assembly 200 is translated in first direction 704, rounded first end 305 initially engages gear teeth 603 to facilitate an axial sliding engagement of locking tooth 304 with gear teeth 603. Additionally or alternatively, a thickness 306 of each locking tooth 304 is reduced at first end 305, relative to a central portion 315 of locking tooth 304, to facilitate an axial sliding engagement of locking tooth 304 with gear teeth 603. Additionally or alternatively, the at least one locking tooth 304 includes any other suitable structure that facilitates an axial sliding engagement of locking tooth 304 with gear teeth 603. In alternative embodiments, first end 305 of at least one locking tooth 304 is not shaped to facilitate an axial sliding engagement with gear teeth 603.

Figure 5:
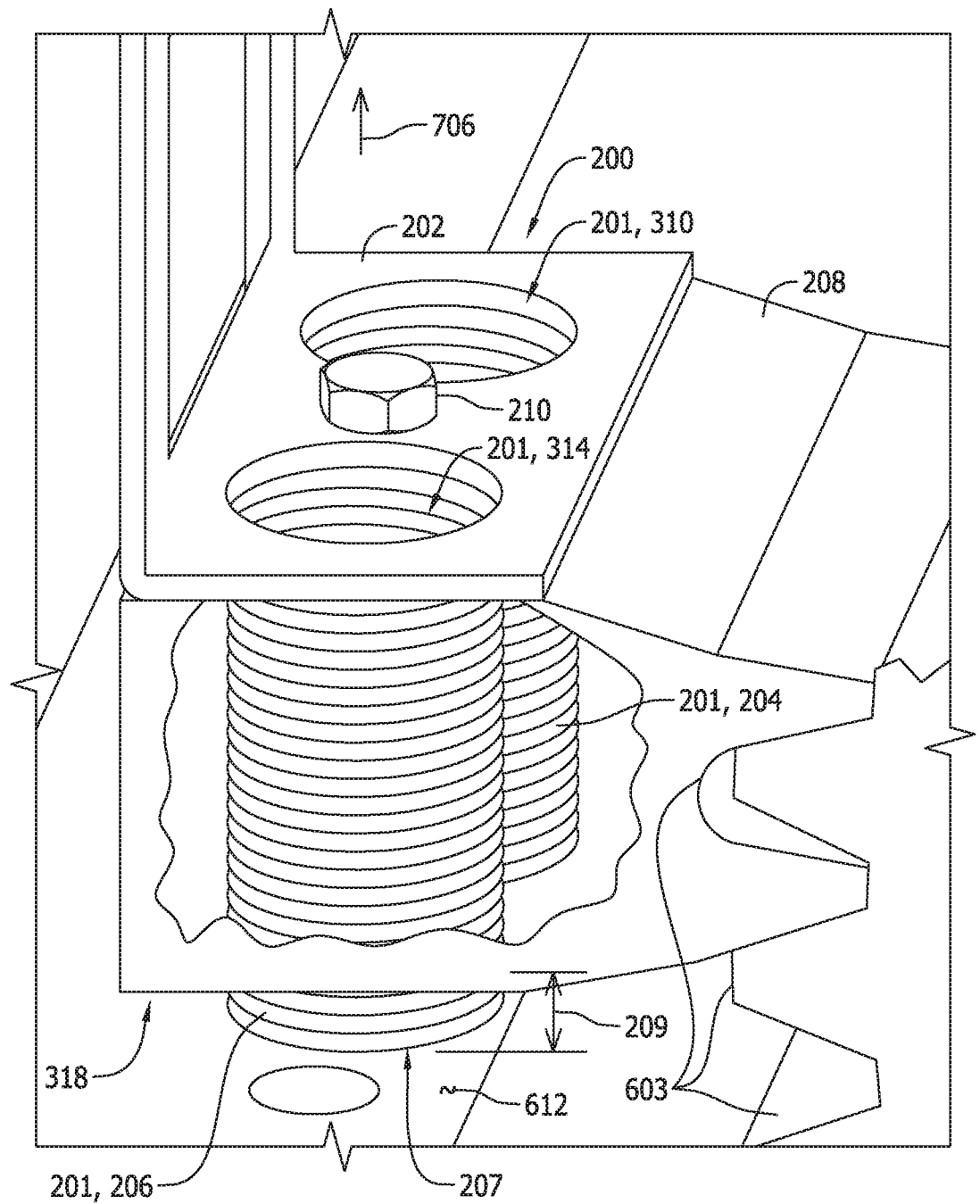
FIG. 5 is a cutaway view of the adjustable locking block assembly shown in FIG. 2.

FIG. 5 is a cutaway view of adjustable locking block assembly 200 coupled to frame 604. With reference to FIGS. 3-5, adjustable locking block assembly 200 includes an adjustment mechanism 201 that, when body 202 is coupled to frame 604 adjacent to gear 602, is operable to translate locking block 208 in a second direction 706 that is substantially orthogonal to gear axis 114. For example, in the exemplary embodiment, adjustment mechanism 201 includes a first threaded opening 310 and a second threaded opening 314 that are defined in a receiving surface 316 of locking block 208. An extension surface 318 of locking block 208 is defined opposite receiving surface 316.

Threaded openings 310 and 314 are sized and oriented to receive a first threaded adjustment bolt 204 and a second threaded adjustment bolt 206, respectively. Adjustment bolts 204 and 206 are threaded within openings 310 and 314 from receiving surface 316, such that a first end 207 of each adjustment bolt 204 and 206 extends out of extension surface 318 of locking block 208 and adjusted to contact a flange 612 of frame 604. More specifically, a distance 209 by which first ends 207 extend out of locking block 208 corresponds to a distance that locking block 208 is translated in second direction 706 relative to frame 604 and, thus, relative to gear teeth 603.

In alternative embodiments, adjustment mechanism 201 includes any other number of threaded adjustment bolts and corresponding threaded openings. Moreover, in other embodiments, adjustment mechanism 201 may include any suitable structure that is operable, when body 202 is coupled to frame 604, to selectively move locking block 208 in second direction 706.

Further in the exemplary embodiment, adjustment bolts 204 and 206 are hollow, and locking block assembly 200 includes a first locking bolt 212 that is sized to be received within threaded adjustment bolt 204, and a second locking bolt 214 that is sized to be received within threaded adjustment bolt 206. More specifically, after locking block 208 is in position and the at least one locking tooth 304 is engaged against gear teeth 603, locking bolts 212 and 214 are inserted through respective hollow adjustment bolts 204 and 206 and coupled to frame flange 612 to secure locking block 208 relative to frame 604. For example, locking bolts 212 and 214 extend through hollow adjustment bolts 204 and 206 and are threadably coupled to suitable openings (not shown) formed in flange 612 to prevent movement of locking block 208 relative to gear 602. Thus, after a position of adjustable locking block assembly 200 is adjusted to a selected location and coupled to gear 602, locking bolts 212 and 214 are used to maintain gear 602 in a locked position relative to frame 604. In alternative embodiments, adjustable locking block assembly 200 includes any other suitable structure that facilitates maintaining gear 602 in the locked position relative to frame 604.

With reference also to FIG. 2, in the exemplary embodiment, body 202 also includes a first opening 222 sized and oriented to receive adjustment bolt 204 and locking bolt 212 therethrough, and a second opening 224 sized and oriented to receive each of adjustment bolt 206 and locking bolt 214 therethrough. In alternative embodiments, body 202 may include any other suitable structure that enables adjustment bolts 204 and 206 and locking bolts 212 and 214 to be received by locking block 208.

Figure 6:
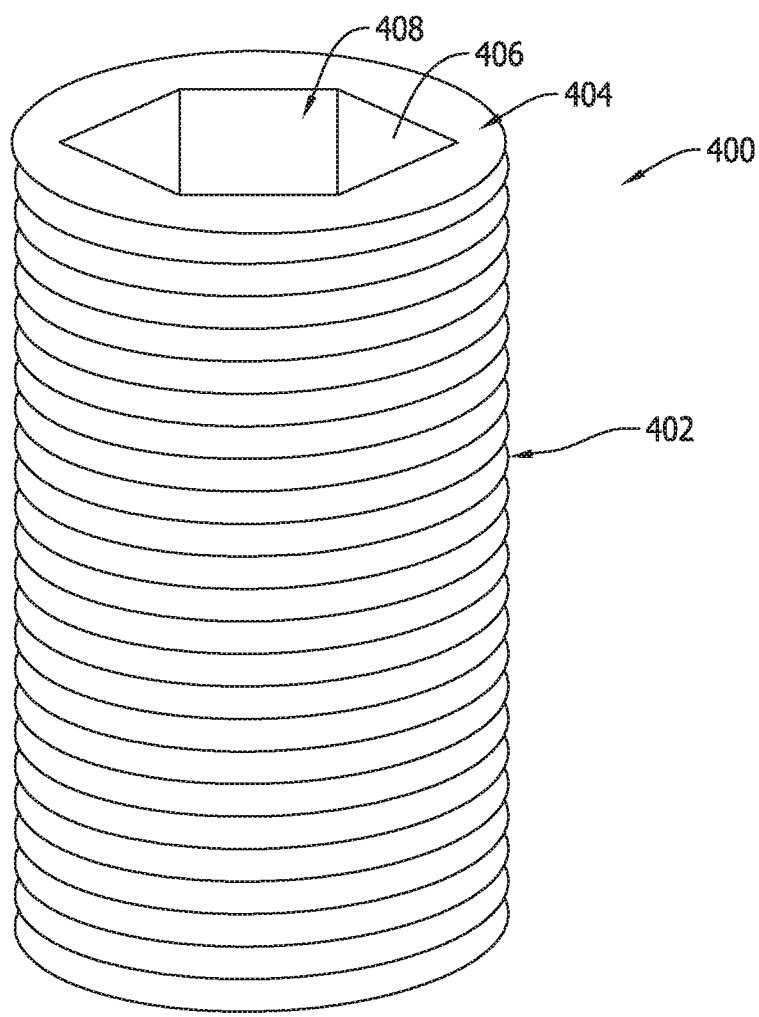
FIG. 6 is a perspective view of an exemplary threaded adjustment bolt that may be used with of the adjustable locking block assembly shown in FIG. 2.

FIG. 6 is a perspective view of an exemplary hollow threaded adjustment bolt 400 that may be used as first adjustment bolt 204 and/or second adjustment bolt 206 with adjustable locking block assembly 200 (shown in FIG. 3). In the exemplary embodiment, hollow threaded adjustment bolt 400 includes a threaded outer surface 402 and a head portion 404. Head portion 404 includes an inner surface 406 that defines a contoured socket 408. Socket 408 is sized and shaped to receive a socket key (not shown), such as an Allen wrench, a hex key, or any other suitable socket key. In the exemplary embodiment, socket 408 is hexagonally-shaped. In alternative embodiments, socket 408 is star-shaped, square-shaped, or any other suitable shape that enables use of a suitable socket key to threadably rotate adjustment bolt 400 within, for example, threaded openings 310 and 314.

Figure 7:
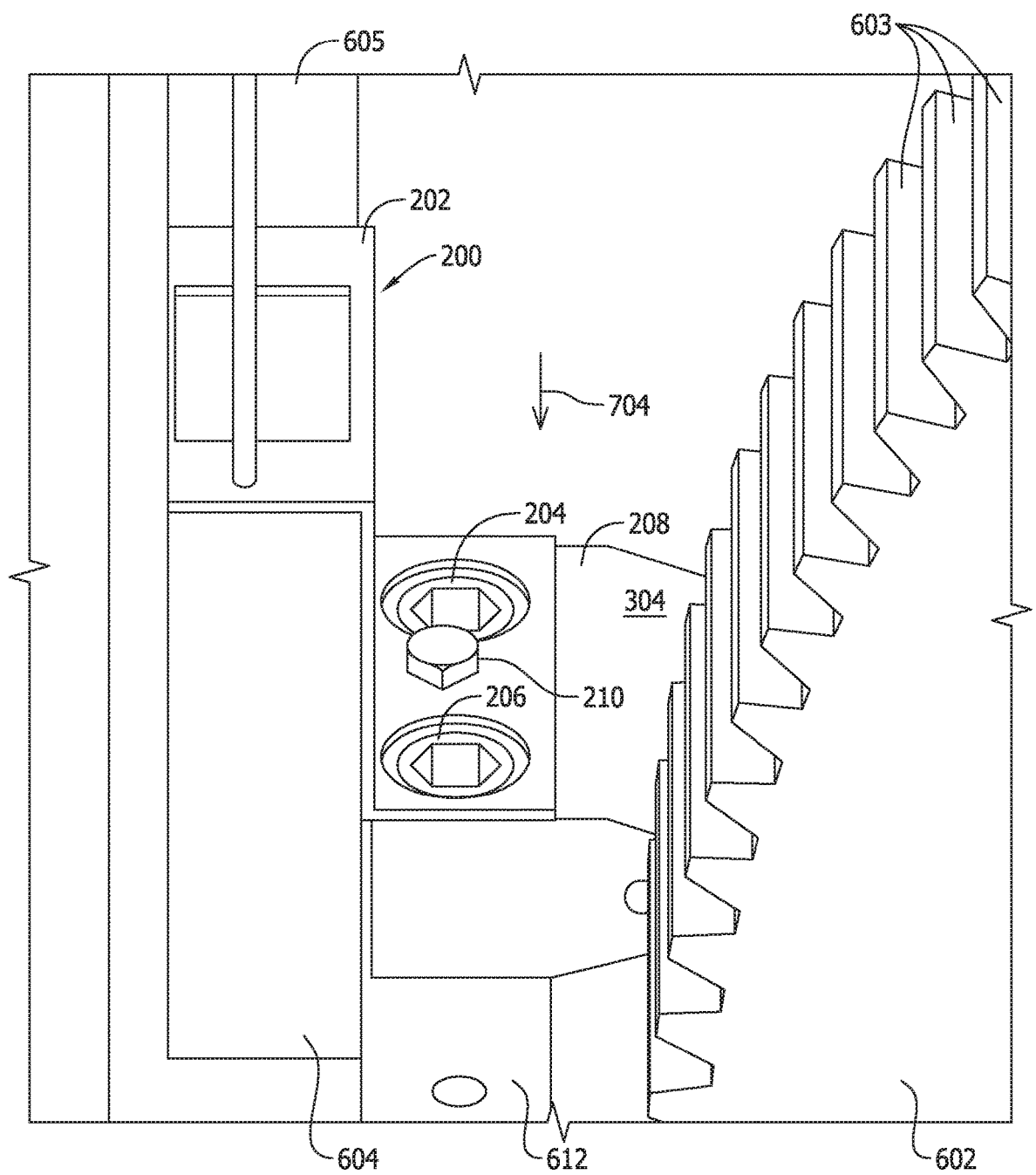
FIG. 7 is a perspective view of the adjustable locking block assembly shown in FIG. 2 during installation on the steam turbine assembly shown in FIG. 1.

FIG. 7 is a perspective view of adjustable locking block assembly 200 (shown in FIG. 2) coupled to frame 604, and prior to coupling against turning gear 602. With reference to FIGS. 1-7, to lock turning gear 602, cover 110 is removed and adjustable locking block assembly 200 is inserted through window 112 of bearing housing 104. More specifically, locking block assembly 200 is lowered over, and coupled against, frame edge 605. In the exemplary embodiment, locking block assembly 200 is initially coupled to frame 604, such that locking block assembly 200 is axially offset from gear 602 parallel to first direction 704, as illustrated in FIG. 7. Thus, locking block assembly 200 is initially coupled to frame 604 without interference between the at least one locking tooth 304 and gear teeth 603.

After locking block assembly 200 is initially coupled to frame 604 at the axial offset from gear 602, a degree of initial alignment of locking tooth 304 and gear teeth 603 is determined. In some embodiments, an initial rotational position of gear 602 about axis 114 is essentially random, such that an initial degree of alignment of locking tooth 304 and gear teeth 603 also is essentially random. Thus, adjustment mechanism 201 is operated to finely adjust a position of locking block 208 in second direction 706 substantially orthogonal to gear axis 114. More specifically, adjustment mechanism 201 is operated to align the at least one locking tooth 304 and gear teeth 603 such that each at least one locking tooth 304 is positioned to be received between a respective pair of gear teeth 603 when locking block assembly 200 is translated along frame 604 in first direction 704 to be axially adjacent gear 602.

For example, in the exemplary embodiment, when locking block assembly 200 is initially coupled to frame 604, first hollow threaded adjustment bolt 204 and second hollow threaded adjustment bolt 206 are threadably positioned within respective threaded openings 310 and 314 such that first end 207 of each adjustment bolt 204 and 206 is flush with extension surface 318 of locking block 208. A socket key (not shown) is inserted alternately in socket 408 of each hollow adjustment bolt 204 and 206, and used to alternately rotate each of adjustment bolts 204 and 206. Adjustment bolts 204 and 206 are threadably advanced until first ends 207 extend out of extension surface 318 of locking block 208 and make contact with frame flange 612. Further threaded advancement of adjustment bolts 204 and 206 within respective threaded openings 310 and 314 reacts against frame 604 to translate adjustable locking block assembly 200 in second direction 706 until each locking tooth 304 is positioned to be received between a pair of complementary shaped gear teeth 603. In alternative embodiments, adjustment mechanism 201 is operated in any suitable manner to adjust a position of locking block 208 in second direction 706 substantially orthogonal to gear axis 114.

Body 202 of locking block assembly 200 is then translated along edge 605 of frame 604 in first direction 704 to be axially adjacent gear 602, such that the at least one locking tooth 304 engages gear teeth 603, as shown in FIG. 3. It should be understood that body 202 is shaped to remain coupled to frame 604 as adjustable locking block assembly 200 is translated in the second direction 706. For example, in the exemplary embodiment, inverted U-shaped portion 216 of body 202 has a sufficient depth such that opposing sides of the U-shape remain engaged with frame 604 in the friction fit as locking block assembly 200 moves in second direction 706, such that body 202 remains slidable along edge 605 parallel to first direction 704 and is prevented from falling from edge 605.

In the exemplary embodiment, after locking block 208 is in position and properly engaged with gear 602, first locking bolt 212 is inserted through first hollow threaded adjustment bolt 204, and second locking bolt 214 is inserted through and second hollow threaded adjustment bolt 206. First locking bolt 212 and second locking bolt 214 are rotated and threadably coupled to flange 612 of frame 604 to secure locking block 208 relative to frame 604 and, thus, to lock gear 602 against turning relative to frame 604. In alternative embodiments, locking block 208 is secured relative to frame 604 in any suitable fashion that enables adjustable locking block assembly 200 to function as described herein.

In an alternative embodiment, locking block 208 is not adjusted in second direction 706 as described above. Rather, turning gearbox and motor 108 is allowed to drive gear 602 (e.g., turning gearbox and motor 108 may be manually controlled) until a pair of complementary shaped gear teeth 603 are positioned to receive each locking tooth 304 therebetween. Body 202 of locking block assembly 200 is then translated along edge 605 of frame 604 in first direction 704 to be axially adjacent gear 602, such that the at least one locking tooth 304 engages gear teeth 603, as shown in FIG. 3, and locking bolts 212 and 214 are coupled to frame 604. Turning gearbox and motor 108 is subsequently disengaged from gear 602.

In some embodiments, locking block assembly 200 may be used to align a rotor or shaft 106 of turbine assembly 100 with a rotor or shaft of another machine, such as an electric generator that is configured to be mechanically coupled to turbine assembly 100. In particular, locking block assembly 200 may facilitate small, incremental, and/or precise adjustments to a position of a turbine rotor or shaft 106 relative to the position of the rotor or shaft of the other machine. For example, when locking block assembly 200 is engaged with gear 602 (as described herein), locking block assembly 200 may be adjusted up and down (e.g., in second direction 706) relative to gear 602, such that locking block assembly 200 causes gear 602 to rotate slightly. In this manner, locking block assembly 200 may be used to make minor adjustments to the rotational position of gear 602 and thus, to the rotational position of shaft 106 and/or a rotor of turbine assembly 100. Accordingly, locking block assembly 200 may be used to bring shaft 106 and/or a rotor of turbine assembly 100 into alignment with a rotor or shaft of another machine. Locking bolts 212 and 214 may be inserted through threaded adjustment bolts 204 and 206 (as described herein) for added security and stability during shaft and/or rotor coupling operations. In addition, in some embodiments, a support structure, such as a steel plate (not shown) may be added or coupled to extension surface 318 of locking block 208 for increased structural rigidity and/or increased structural integrity.

Figure 8:
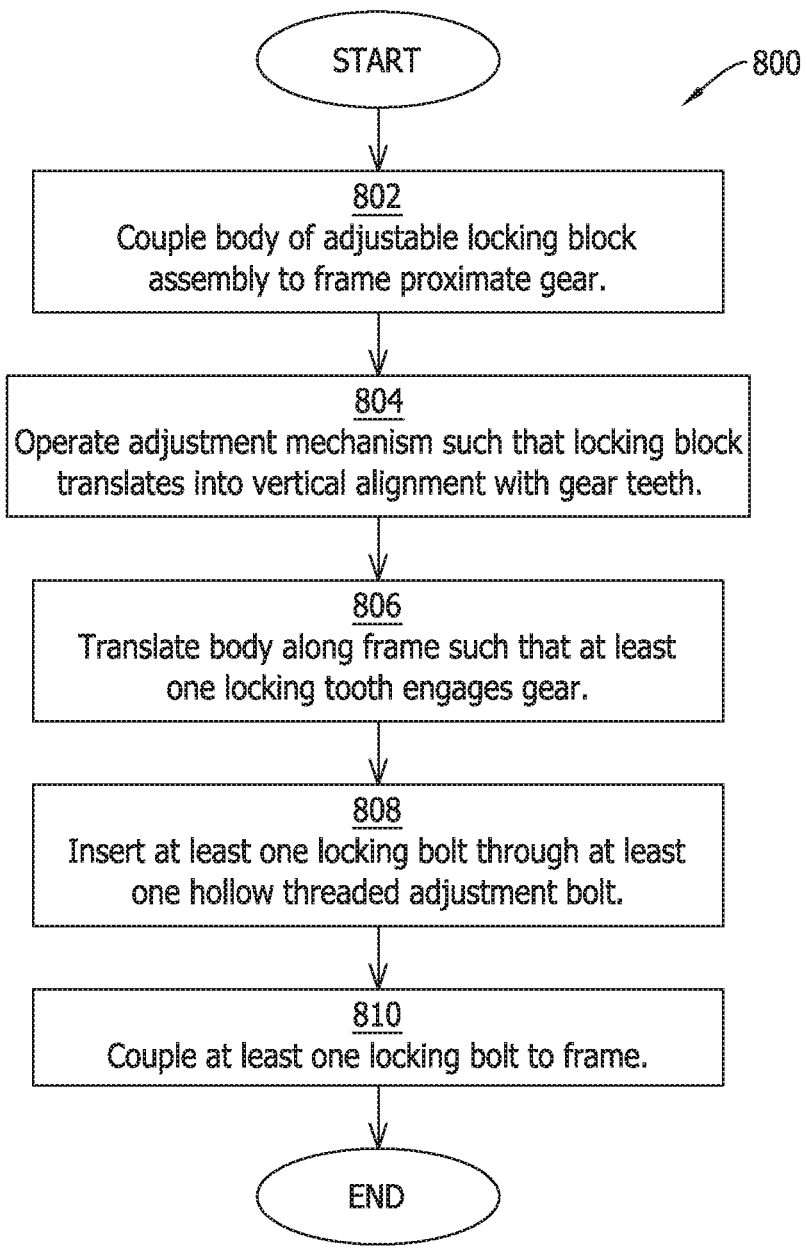
FIG. 8 is a flow diagram of an exemplary method of locking a gear.

FIG. 8 is a flow diagram of an exemplary method 800 of locking a toothed gear to prevent movement. In the exemplary embodiment, and with reference to FIGS. 1-8, body 202 of adjustable locking block assembly 200 is coupled 802 to a portion of frame 604 adjacent to gear 602. As described herein, adjustable locking block assembly 200 includes a locking block 208 coupled to body 202, and locking block 208 includes at least one locking tooth 304 shaped complementary to gear teeth 603.

Adjustment mechanism 201 is operated 804 to move locking block 208 in a second direction 706 that is tangential to gear teeth 603 until the at least one locking tooth 304 is positioned between a pair of circumferentially adjacent gear teeth 603. Adjustment mechanism 201 is operated 806 to threadably adjust at least one threaded adjustment bolt 204 and/or 206 within at least one threaded opening 310 and/or 314, respectively, such that first end 207 of each adjustment bolt 204 and 206 is coupled within an opening and extends out of extension surface 318 of locking block 208 opposite receiving surface 316. To threadably adjust at least one threaded adjustment bolt 204 and 206, threaded adjustment bolt 204 and/or 206 is rotated with the socket key (not shown) adjacent to receiving surface 316.

Further, body 202 is moved 806 along frame 604 in a first direction 704 that is substantially parallel to gear axis 114, such that at least one locking tooth 304 engages gear 602. More particularly, body 202 is moved along frame 604 until first end 207 of at least one locking tooth 304 initially engages gear teeth 603. In the exemplary embodiment, body 202 is translated 806 such that locking tooth first end 207, which has a rounded shape, initially engages gear teeth 603. Body 202 is further translated 806 along frame 604, such that body 202 slides along edge 605 parallel to first direction 704 until body 202 is positioning adjacent to turning gear 602.

Locking block assembly 200 is secured by inserting 808 at least one locking bolt 212 and/or 214 through the at least one hollow threaded adjustment bolt 204 and 206, and coupling 810 at least one locking bolt 212 and 214 to frame 604, such that locking block 208 is secured relative to frame 604. Once locking block 208 is secured relative to frame 604 and engaged with gear 602, locking block 208 may prevent rotation of gear 602, such that inspection and maintenance may be safely performed.

Embodiments of the adjustable locking block assembly, as described above, facilitate locking a toothed gear of a rotatable machine to prevent its movement during inspection and/or maintenance. More particularly, embodiments of the adjustable locking block assembly include a body shaped to couple to, for example, a frame housing the toothed gear, for movement in a first direction that is substantially parallel to an axis of the gear. The embodiments also include a locking block that couples to the body and having at least one tooth shaped complementary to the teeth of the gear. When the body is coupled to the frame, the relative position of the locking block is adjustable in a second direction that is tangential to the teeth of the gear. The adjustable locking block thus enables fine adjustment of a position of the locking block with respect to the teeth of the gear to ensure that at least one tooth of the locking block smoothly engages with gear teeth of the turning gear when the body is moved axially adjacent to the gear. The locking block assembly is, in addition, associated with a low manufacturing cost and may be implemented in a variety of systems having toothed gears.

Exemplary technical effects of the locking block assembly described herein include, for example: (a) aligning at least one tooth of a locking block with respect to a toothed gear prior to engaging the locking tooth with the gear teeth; (b) hanging or suspending the locking block from a frame of a rotatable machine assembly in a manner that allows axial translation of the locking block to engage the gear, thereby reducing a risk of unintended fall of the locking block into the gear assembly frame; and (c) simple, rapid locking of a toothed gear of a rotatable machine assembly to ensure that the rotatable machine assembly remains stationary during inspection and maintenance.

Exemplary embodiments of an adjustable locking block assembly and related components are described above in detail. The assembly is not limited to the specific embodiments described herein, but rather, components of the assembly and/or steps of the methods may be utilized independently and separately from other components and/or steps described herein. For example, the configuration of components described herein may also be used in combination with other processes, and is not limited to practice with the assemblies and related methods as described herein. Rather, the exemplary embodiment can be implemented and utilized in connection with many applications where locking a toothed gear is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

PARTS LIST steam turbine system . . . 100
turbine portion . . . 102
front standard . . . 104
shaft . . . 106
turning gear motor . . . 108
cover . . . 110
adjustable locking block assembly . . . 200
hanger . . . 202
first hollow threaded adjustment bolt . . . 204
second hollow threaded adjustment bolt . . . 206
locking block . . . 208
fastener . . . 210
first locking bolt . . . 212
a second locking bolt . . . 214
U-shaped portion . . . 216
L-shaped portion . . . 218
corner . . . 220
first locking bolt hole . . . 222
second locking bolt hole . . . 224
body portion . . . 302
first gear tooth . . . 304
first rounded edge . . . 305
second gear tooth . . . 306
second rounded edge . . . 307
first threaded cylindrical surface . . . 308
first threaded cylindrical passage . . . 310
second threaded cylindrical surface . . . 312
second threaded cylindrical passage . . . 314
receiving surface . . . 316
space . . . 320
hollow threaded adjustment bolt . . . 400
threaded outer surface . . . 402
head portion . . . 404
shaped inner surface . . . 406
shaped socket . . . 408
turning gear . . . 602
frame . . . 604
edge . . . 606
first shaped socket . . . 608
second shaped socket . . . 610
turning gear tooth . . . 702

What is claimed is:

1. A block assembly for use in locking a toothed gear in position within a frame, said block assembly comprising:
   a body comprising a first portion configured to slidably couple to a portion of the frame adjacent to the gear for translation in a first direction parallel to an axis of the gear;
   a locking block coupled to a second portion of said body, said locking block comprising at least one locking tooth shaped complementary to at least one gear tooth of the gear; and
   an adjustment mechanism operable, when said body is coupled to the frame, to selectively move said locking block in a second direction that is substantially orthogonal to the axis of the gear, such that said at least one locking tooth is received between a circumferentially spaced pair of the gear teeth to prevent movement of the gear.

2. The block assembly of claim 1, wherein said adjustment mechanism comprises:
   at least one threaded opening defined in a receiving surface of said locking block and extending therethrough; and
   at least one threaded adjustment bolt receivable within said at least one threaded opening, wherein a depth of said at least one adjustment bolt within said at least one opening is threadably adjustable such that a first end of said at least one adjustment bolt extends out of an extension surface of said locking block opposite said receiving surface.

3. The block assembly of claim 2, wherein said at least one threaded adjustment bolt defines a socket sized and oriented to receive at least a portion of a socket key.

4. The block assembly of claim 2, wherein said at least one threaded adjustment bolt is hollow, said adjustable locking block assembly further comprises at least one locking bolt receivable through said at least one hollow threaded adjustment bolt and coupleable to the frame to secure said locking block relative to the frame.

5. The block assembly of claim 1, wherein said at least one locking tooth comprises a first end shaped to facilitate axially sliding engagement with the gear teeth.

6. The block assembly of claim 5, wherein said at least one locking tooth first end is rounded.

7. The block assembly of claim 5, wherein said at least one locking tooth first end has a reduced thickness relative to a central portion of said at least one locking tooth.

8. The block assembly of claim 1, wherein said body and said locking block are rigidly coupled together, such that said body and said locking block are constrained to move together.

9. The block assembly of claim 1, wherein said body comprises an inverted U-shaped portion shaped to receive an edge of the frame in a friction fit, such that said body is slidable along the edge parallel to the first direction.

10. The block assembly of claim 1, wherein the frame comprises a steam turbine.

11. A method of locking a toothed gear relative to a frame, said method comprising:
   coupling a body of an adjustable locking block assembly to a portion of the frame proximate the gear, wherein the locking block assembly includes a locking block and at least one locking tooth shaped complementary to at least one tooth of the gear;
   operating an adjustment mechanism to selectively move the locking block in a direction that is substantially orthogonal to an axis of rotation of the gear, such that the at least one locking tooth is positioned between a pair of circumferentially spaced gear teeth; and
   selectively positioning the body along the frame in a first direction that is substantially parallel to the axis of rotation of the gear, such that the at least one locking tooth engages the gear to prevent movement of the gear,
   wherein said coupling the body to the portion of the frame proximate the gear comprises one of: coupling the body to the portion of the frame proximate a turning gear of a steam turbine; and coupling the body to an edge of a window defined in the steam turbine.

12. The method of claim 11, wherein the adjustment mechanism includes at least one threaded opening defined in a receiving surface of the locking block and extending therethrough, said operating the adjustment mechanism comprises threadably adjusting at least one threaded adjustment bolt within the at least one threaded opening such that a first end of the at least one adjustment bolt extends out of the locking block opposite the receiving surface.

13. The method of claim 12, wherein the at least one threaded adjustment bolt defines a socket sized to receive a socket key, said threadably adjusting the at least one threaded adjustment bolt comprises rotating the at least one threaded adjustment bolt with the socket key.

14. The method of claim 12, wherein the at least one threaded adjustment bolt is hollow, said method further comprises:
   inserting at least one locking bolt through the at least one hollow threaded adjustment bolt; and
   coupling the at least one locking bolt to the frame such that the locking block is secured relative to the frame.

15. The method of claim 11, wherein the at least one locking tooth includes a first end shaped to facilitate axially sliding engagement with the gear teeth, said translating the body along the frame comprises translating the body such that the first end of the at least one locking tooth initially engages the gear teeth.

16. The method of claim 15, wherein said translating the body such that the first end of the at least one locking tooth initially engages the gear teeth comprises translating the body such that the locking tooth first end having a rounded shape initially engages the gear teeth.

17. The method of claim 15, wherein the first end of the at least one locking tooth has a reduced thickness relative to a central portion of the at least one locking tooth, said translating the body further comprises moving the body such that the first end of the at least one locking tooth initially engages the gear teeth.

18. The method of claim 11, wherein the body and the locking block are rigidly coupled together, said operating the adjustment mechanism further comprises operating the adjustment mechanism such that the body is translated along with the locking block.

19. The method of claim 11, wherein the body includes an inverted U-shaped portion shaped to receive an edge of the frame in a friction fit, said translating the body along the frame comprises sliding the body along the edge.

* * * * *